UNITED STATES PATENT OFFICE.

J. H. WURTZ, OF NEW YORK, N. Y.

IMPROVEMENT IN PROCESSES FOR MANUFACTURING ALUM.

Specification forming part of Letters Patent No. 7,737, dated October 22, 1850.

*To all whom it may concern:*

Be it known that I, JACOB HENRY WURTZ, of New York, in the county of New York and State of New York, have invented a method of obtaining alum by the action of sulphuric acid upon the substance called "greensand," "greensand-marl," or simply "marl;" and I do hereby declare that the following is a full and exact description thereof.

The nature of my invention consists in obtaining alum from the greensand by the action of sulphuric acid upon it.

To enable others to use my invention, I will proceed to describe its nature in detail.

The variety of greensand used for obtaining alum should be free from lime and magnesia. It is first pulverized and ignited. It is preferable to pulverize it previous to ignition, and to cause it by stirring or otherwise to come into contact with the air as much as possible during the ignition for the sake of peroxidizing all the iron present. Too high a heat should be avoided, as it may partially fuse the greensand, rendering it undecomposible by sulphuric acid. The greensand, after being thus prepared, is mixed with sulphuric acid, either in the dilute state in which it runs from the leaden chambers in which it is manufactured, or in the concentrated state, as common oil of vitriol. The quantity of acid used must be commensurate with the quantity of potash contained in the particular variety of greensand operated upon. The mixture is then exposed to heat for a time, dependent upon the state of pulverization of the greensand. If concentrated oil of vitriol were used, water must be added to supply water of crystallization to the alum formed. When the greensand is decomposed, which takes place almost immediately when it has been previously finely pulverized, water is added and a solution obtained which contains for the most part common alum, with some sulphate of alumina and a little iron alum. If the alum is required free from iron, the addition of a sufficient quantity of chloride of potassium will convert the iron alum into common alum, and the solution gives then, upon crystallization, pure alum, the iron remaining (as perchloride) in the mother-liquor.

What I claim as my invention, and desire to secure by Letters Patent, is—

The obtaining of alum by the action of sulphuric acid or its equivalent upon the substance called "greensand," "greensand-marl," or simply "marl."

JACOB HENRY WURTZ.

Witnesses:
WOLCOTT GIBBS,
WILLIAM H. ELLET.